(12) United States Patent
Ertas et al.

(10) Patent No.: US 10,801,549 B2
(45) Date of Patent: Oct. 13, 2020

(54) AXIAL LOAD MANAGEMENT SYSTEM

(71) Applicant: General Electric Company, Schenectady, NY (US)

(72) Inventors: Bugra Han Ertas, Niskayuna, NY (US); Douglas Carl Hofer, Clifton Park, NY (US); Younkoo Jeong, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/993,819

(22) Filed: May 31, 2018

(65) Prior Publication Data

US 2019/0368549 A1 Dec. 5, 2019

(51) Int. Cl.
*F16C 39/04* (2006.01)
*F16C 17/04* (2006.01)
(Continued)

(52) U.S. Cl.
CPC .............. *F16C 39/04* (2013.01); *F01D 3/00* (2013.01); *F01D 17/08* (2013.01); *F01D 25/168* (2013.01);
(Continued)

(58) Field of Classification Search
CPC .. F16C 17/04; F16C 32/0614; F16C 32/0622; F16C 32/0648; F16C 32/0655;
(Continued)

(56) References Cited

U.S. PATENT DOCUMENTS 3,763,700 A * 10/1973 MacDonald .............. G01L 5/12
73/862.49
4,413,946 A * 11/1983 Marshall ............... F04D 27/023
415/11
(Continued)

FOREIGN PATENT DOCUMENTS

EP 1281836 A2 2/2003
WO WO0116466 A1 3/2001
(Continued)

OTHER PUBLICATIONS

Zhu et al., "Rotordynamic Performance of Flexure Pivot Hydrostatic Gas Bearings for Oil-Free Turbomachinery", Journal of Engineering for Gas Turbines and Power, vol. 129, Issue: 04, pp. 1020-1027, Jan. 2, 2007.
(Continued)

*Primary Examiner* — Marcus Charles
(74) *Attorney, Agent, or Firm* — Dority & Manning, P.A.

(57) ABSTRACT

An axial load management system for a turbomachine including a rotating drivetrain, a thrust bearing assembly, a sensor, and a valve supply line. The rotating drivetrain includes a compressor section and an expander section fluidly coupled together by a closed flowpath. The thrust bearing assembly includes a thrust runner, a thrust bearing housing, and a gas thrust bearing extending between the thrust runner and the thrust bearing housing. Further, the gas thrust bearing supports the rotating drivetrain. The sensor is attached to at least one of the thrust bearing housing or the gas thrust bearing. The valve supply line is fluidly coupled to the closed flowpath. A valve positioned within the valve supply line selectively allows a working fluid to flow between the closed flowpath and a thrust chamber defined by a rotating surface and a fixed surface to modify an axial load on the rotating drivetrain.

20 Claims, 6 Drawing Sheets

(51) Int. Cl.
*F16C 32/06* (2006.01)
*F01D 3/00* (2006.01)
*F01D 25/16* (2006.01)
*F01D 25/22* (2006.01)
*F01D 17/08* (2006.01)
*G01L 5/00* (2006.01)

(52) U.S. Cl.
CPC .............. *F01D 25/22* (2013.01); *F16C 17/04* (2013.01); *F16C 32/0648* (2013.01); *F16C 32/0655* (2013.01); *G01L 5/009* (2013.01); *F05D 2240/52* (2013.01); *F05D 2240/55* (2013.01); *F05D 2270/331* (2013.01); *F05D 2270/808* (2013.01)

(58) Field of Classification Search
CPC ... F16C 39/04; F01D 3/00; F01D 3/04; F01D 17/02; F01D 17/08; F01D 17/14; F01D 25/168; F01D 25/22; F05D 2240/52; F05D 2240/55; F05D 2270/331; F05D 2270/808; G01L 5/0009; G01L 5/0028
USPC ....... 384/105, 109, 121, 247, 420, 448, 479, 384/590; 415/26, 104, 112, 227
See application file for complete search history.

(56) References Cited

U.S. PATENT DOCUMENTS

| | | | | |
|---|---|---|---|---|
| 4,510,894 A * | 4/1985 | Williams | ................ | F02B 75/26 123/48 AA |
| 5,104,284 A | 4/1992 | Hustak, Jr. et al. | | |
| 5,248,239 A * | 9/1993 | Andrews | .................... | F01D 3/00 415/104 |
| 5,760,289 A * | 6/1998 | Skottegard | ................ | F01D 3/04 415/104 |
| 6,360,616 B1 * | 3/2002 | Halliday | ............... | G01L 5/0009 73/862.49 |
| 6,367,241 B1 | 4/2002 | Ress, Jr. et al. | | |
| 6,616,423 B2 | 9/2003 | Bosen | | |
| 6,851,862 B2 | 2/2005 | Gozdawa | | |
| 6,957,945 B2 | 10/2005 | Tong et al. | | |
| 7,195,443 B2 | 3/2007 | Vandervort et al. | | |
| 7,948,105 B2 | 5/2011 | Agrawal et al. | | |
| 8,092,150 B2 * | 1/2012 | Rofka | ....................... | F01D 3/04 415/1 |
| 8,397,506 B1 | 3/2013 | Wright et al. | | |
| 8,480,352 B2 | 7/2013 | Zheng et al. | | |
| 8,568,084 B2 * | 10/2013 | Zheng | .................... | F01D 11/025 415/104 |
| 8,893,499 B2 | 11/2014 | Maier | | |
| 9,476,428 B2 | 10/2016 | Agrawal et al. | | |
| 9,746,029 B1 | 8/2017 | Mook et al. | | |
| 2002/0097928 A1 | 7/2002 | Swinton et al. | | |
| 2004/0101395 A1 * | 5/2004 | Tong | ......................... | F01D 3/04 415/1 |
| 2010/0287905 A1 * | 11/2010 | Shepler | .................... | F02C 9/285 60/39.24 |
| 2011/0260456 A1 * | 10/2011 | Harris | ...................... | F03B 3/00 290/52 |
| 2014/0084588 A1 | 3/2014 | Agrawal et al. | | |
| 2016/0047309 A1 | 2/2016 | Davidson et al. | | |
| 2017/0227057 A1 * | 8/2017 | Hamrodi | ............... | G01L 5/0009 |
| 2017/0298766 A1 | 10/2017 | Ertas et al. | | |

FOREIGN PATENT DOCUMENTS

| | | |
|---|---|---|
| WO | WO2015043881 A1 | 4/2015 |
| WO | WO2016073252 A1 | 5/2016 |

OTHER PUBLICATIONS

Gjika et al., "Axial Load Control on High-Speed Turbochargers: Test and Prediction", ASME Turbo Expo 2008: Power for Land, Sea, and Air, vol. 01, pp. 705-712, Jun. 9-13, 2008.

Barnett, et al., Application of Air Bearings to High-Speed Turbomachinery, SAE Technical Paper 700720, Feb. 1, 1970, 10 pages. (Abstract Only).

Agrawal, Foil Air/Gas Bearing Technology—An Overview, ASME 1997 International Gas Turbine and Aeroengine Congress and Exhibition, vol. 1, Jun. 2-5, 1997, 11 Pages.

Wright et al., Operation and Analysis of a Supercritical CO2 Brayton Cycle, Sandia Report, SAND2010-0171, Sandia National Laboratories, Sep. 2010, 101 Pages. http://prod.sandia.gov/techlib/access-control.cgi/2010/100171.pdf.

Bauer, et al., Pathways to cost competitive CSP via sc-CO2 power cycles, Supercritical CO2 Power Cycles Symposium, SunShot, US Department of Energy, Mar. 2016, 21 Pages. http://sco2symposium.com/www2/sco2/papers2016/SystemModeling/119pres.pdf.

Brown, Multiphysics Analysis of Pressurized CO2 Foil Thrust Bearing Characteristics, Knolls Atomic Power Laboratory, Comsol News, 2012, Niskayuna, NY, pp. 58-60. https://www.comsol.com/story/download/157469/Knolls_CN12.pdf.

Iverson, et al., Supercritical CO2 Brayton Cycles for Solar-Thermal Energy, Applied Energy, 2013, pp. 957-970. https://doi.org/10.1016/j.apenergy.2013.06.020.

Wright et al., Overview of Supercritical CO2 Power Cycle Development, Sandia National Laboratories, 2011 University Turbine Systems Research Workshop, Oct. 25-27, 2011, Columbus, OH, 30 Pages. https://www.netl.doe.gov/publications/proceedings/11/utsr/pdf/wed/Wright%20SCO2%20Power%20Cycle%20Summary%20UTSR%202011%20v2a.pdf.

International Search Report Corresponding to Application No. PCT/US/2019/034614 dated Jul. 31, 2019.

International Written Opinion Corresponding to Application No. PCT/US2019/034614 dated Jul. 31, 2019.

\* cited by examiner

AXIAL LOAD MANAGEMENT SYSTEM

FEDERALLY SPONSORED RESEARCH

This invention was made with government support under contract number DE-EE0007109 of the Department of Energy. The government may have certain rights in the invention.

FIELD OF TECHNOLOGY

The present subject matter relates generally to an axial load management system, or, more particularly, to a thrust bearing load management system for a gas thrust bearing.

BACKGROUND

A turbomachine generally includes, in serial flow order, a compressor section, a heat exchange section, and an expander section. Conventional turbomachines include rotor assemblies having shafts, compressor impellers, turbines, couplings, sealing packs, and other elements for optimal operation under given operating conditions. These rotor assemblies have a mass generating a constant static force due to gravity, and also generate a dynamic force due, e.g., to imbalances in the rotor assembly during operation, accelerations, etc. In addition to radial shaft forces, the rotating assembly also experiences axial forces generated from, e.g., internal pressures between the turbomachinery stages and the thrust of the turbomachine. Such turbomachines include radial bearings and thrust bearings to sustain and support these forces while permitting rotation of the rotor assembly. For example, the sum of the axial forces may result in a net axial force or thrust. Such thrust may be in the forward or aft direction. The thrust bearing may be employed to absorb this thrust and allow the rotor assembly to continue rotation.

A rotating drivetrain of the turbomachine (e.g., the compressor section and turbine section) may generally be supported by oil-lubricated bearings. However, oil-lubricated bearings require additional pumps, sumps, and dedicated flowpaths, which may increase cost and/or weight of the turbomachine. Additionally, the oil-lubricated bearings may generate undesired heat at the oil-film clearance due to fluid shear. Some turbomachines contain gas bearings utilizing a gas to lubricate the rotating drivetrain. Certain gas thrust bearings may have a reduced load capacity compared to oil lubricated bearings due to the inherent reduced viscosity of a gas or similar fluids when compared to a liquid like oil.

As such, it is desirable to reduce and control the axial thrust acting on a gas thrust bearing.

BRIEF DESCRIPTION

Aspects and advantages will be set forth in part in the following description, or may be obvious from the description, or may be learned through practice of the invention.

In one aspect, the present disclosure is directed to an axial load management system for a turbomachine. The axial load management system includes a rotating drivetrain, a thrust bearing assembly, a sensor, and a valve supply line. The rotating drivetrain includes a compressor section and an expander section. A closed flowpath fluidly couples the compressor section and expander section. The thrust bearing assembly includes a thrust runner, a thrust bearing housing, and a gas thrust bearing. The gas thrust bearing extends between the thrust runner and the thrust bearing housing. Further, the gas thrust bearing supports the rotating drivetrain. The sensor is attached to at least one of the thrust bearing housing or the gas thrust bearing. The valve supply line is fluidly coupled to the closed flowpath. A valve positioned within the valve supply line selectively allows a working fluid to flow between the closed flowpath and a thrust chamber defined by a rotating surface and a fixed surface to modify an axial load on the rotating drivetrain.

In one embodiment, the gas thrust bearing may be hermetically sealed with the closed flowpath. As such, the gas thrust bearing may utilize the working fluid to support the rotating drivetrain. In alternative embodiments, the thrust chamber may be hermetically sealed with the closed flowpath. Further, the valve may allow the working fluid to flow and change a pressure of the thrust chamber. In certain embodiments, the thrust chamber may be positioned in a high pressure region of the compressor section. In a further embodiment, the thrust chamber may be positioned in a low pressure region of the compressor section. In additional embodiments, the axial load management system may further include a heat exchanger thermally coupled to the closed flowpath for adding heat to a working fluid. In another embodiment, the valve may be a first valve, and the thrust chamber may be a first thrust chamber. In such an embodiment, the axial load management system may further include a second valve fluidly coupled to the closed flowpath. The second valve may selectively allow the working fluid to flow between the closed flowpath and a second thrust chamber.

In one embodiment, the axial load management system may further include a controller communicatively coupled to the sensor and the valve. The controller may communicate a signal to the valve to allow the working fluid to flow between the closed flowpath and the thrust chamber. In another embodiment, the controller may be a closed loop controller. In additional embodiments, the sensor may be a force transducer. In a still further embodiment, the sensor may be a temperature sensor. In another embodiment, the sensor may be a pressure sensor.

In another aspect, the present disclosure is directed to a method of managing an axial load on a gas thrust bearing. The method includes measuring the axial load on the gas thrust bearing using a sensor communicatively coupled to a controller. Another step includes determining a difference between a target axial load and the measured axial load. The method also includes communicating a signal to a valve fluidly coupled to a compressor section of a turbomachine. The signal selectively opens the valve, closes the valve, or partially closes the valve causing a change in the pressure of a thrust chamber fluidly coupled to the valve. As such, changing the pressure of the thrust chamber modifies the axial force on the gas thrust bearing.

In one embodiment, the method may include measuring a modified axial load on the gas thrust bearing using the sensor. In such embodiments, the method may also include changing the modified axial load on the gas thrust bearing based on a difference between the modified axial load and the target axial load by communicating a signal to alter the pressure of the thrust chamber. In additional embodiments, the target axial load may be a neutral axial load. In a further embodiment, the thrust chamber may be a first thrust chamber, and the valve may be a first valve. In such an embodiment, the method may include communicating a signal to a second valve fluidly coupled to the compressor section of the turbomachine. The signal may selectively open the second valve, close the second valve, or partially close the second valve causing a change in the pressure of a second thrust chamber fluidly coupled to the second valve. Further, changing the pressure of the second thrust chamber may modify the axial force on the gas thrust bearing.

In a further embodiment, the controller may be a closed loop controller. In still further embodiments, the method may include determining a derivative of the axial load on the gas thrust bearing using the sensor communicatively coupled to the controller. In other embodiments, the method may include determining an integral of the axial load on the gas thrust bearing using the sensor communicatively coupled to the controller. Additional embodiments of the method may include determining a derivative and an integral of the axial load on the gas thrust bearing using the sensor communicatively coupled to the controller.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
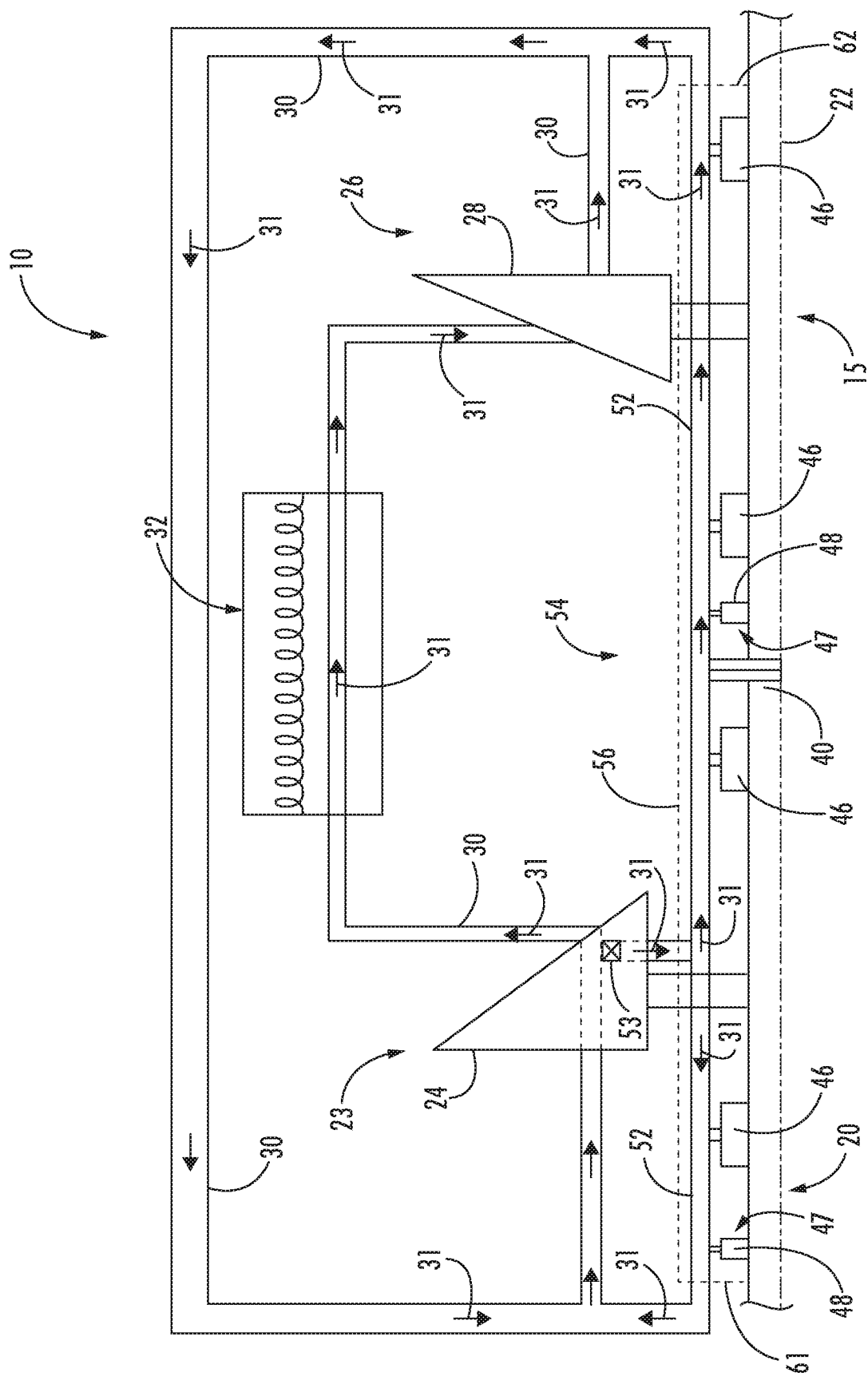
FIG. 1 is a schematic view of a turbomachine including a closed flowpath according to aspects of the present disclosure.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicating," "communicative," "communicatively," and the like refer to direct communication or indirect communication such as through a memory system or another intermediary system.

Referring now to FIG. 1, a schematic view of a turbomachine 10 is illustrated including a closed flowpath 30 hermetically sealed with a lubrication flowpath 52 according to aspects of the present disclosure. In the exemplary embodiment, the turbomachine 10 includes a rotating drivetrain 20 defining a centerline 22 extending along a length of the turbomachine 10. For the depicted embodiment, the rotating drivetrain 20 includes a compressor section 23 that includes a compressor 24. In the embodiment shown, the compressor 24 is a centrifugal compressor. In certain embodiments, the compressor 24 may be an axial compressor. Further, in the illustrated embodiment, the rotating drivetrain 20 includes an expander section 26 that includes an expander 28. In certain embodiments the expander 28 may be a turbine.

For the depicted embodiment, the turbomachine 10 is hermetically sealed, and the flowpath is a closed flowpath 30. In the illustrated embodiment, the compressor section 23 and expander section 26 together define at least in part the closed flowpath 30 for the flow of a working fluid (depicted schematically using arrows 31). For instance, the closed flowpath 30 may fluidly couple the compressor section 23 and the expander section 26. Further, for the illustrated embodiment, the working fluid 31 is piped from the expander section 26 back to the compressor section 23 via the closed flowpath 30. Additionally, for the exemplary embodiment, a heat exchanger 32 may be thermally coupled to the closed flowpath 30 for adding heat to the working fluid 31. It should be recognized that, though the flowpath is described as closed and/or hermetically sealed, the closed flowpath 30 may include leakage and/or parasitic losses where some of the working fluid 31 leaks from the closed flowpath 30. Further, there may be a plurality of additional components fluidly coupled to the closed flowpath 30, such as booster pumps, valves, pressure regulators, etc.

For example, the working fluid 31 may be progressively compressed while traveling through the compressor 24. In the shown embodiment, energy in the form of heat is added to the working fluid 31 at the heat exchanger 32. For the embodiment depicted, the heat exchanger 32 is located downstream of the compressor section 23 and upstream of the expander section 26. It should be recognized that the heat added in the heat exchanger 32 may come from any heat source. For example, the heat source may be a heat recovery system utilizing hot combustion gases from another turbomachine. In other embodiments, the heat source may be solar energy such as energy from a helio-stat field. Still, in other embodiments, the heat source may be geothermal, nuclear, combustion, or any other heat source.

For the exemplary embodiment, energy is then extracted from the working fluid 31 in the expander 28 as mechanical energy. As such, for the illustrated embodiment, the energy extracted in the expander 28 is used to drive the compressor 24. In some embodiments, the energy extracted in the expander 28 may also be used to drive an electric machine coupled to the rotating drivetrain 20. For example, the rotating drivetrain 20 may mechanically couple the expander 28 to the compressor 24 and an electric machine (e.g., a generator or an alternator). It should be recognized that, in other embodiments, the turbomachine 10 may include additional compressors 24 and/or expanders 28 in the closed flowpath 30.

Further, the working fluid 31 in the closed flowpath 30 may be a supercritical fluid. For example, the working fluid 31 may be supercritical carbon dioxide. In other embodiments, the working fluid may be any other supercritical fluid known in the art. For instance, the supercritical fluid may be supercritical water (sH2O). Still, in other embodiments, the working fluid 31 may be any other suitable fluid, such as steam. For the shown embodiment, the rotating drivetrain 20 may include a coupling 40 attaching the compressor section 23 and the expander section 26. For example, the coupling 40 may couple the compressor 24 to the expander 28. The coupling 40 may be a rigid coupling or a flexible coupling. Still in other embodiments, the rotating drivetrain 20 may be formed integrally as a single component.

Referring still to FIG. 1, for the depicted embodiment, the turbomachine 10 includes a fluid bearing assembly 15. In the illustrated embodiment, the fluid bearing assembly 15 supports the rotating drivetrain 20. For example, the fluid bearing assembly 15 may include at least one fluid bearing and a sealing system 54. For the embodiment depicted, the fluid bearing assembly 15 includes a plurality of fluid bearings, such as two or more. The plurality of fluid bearings may include at least one gas radial bearing 46, or rather a plurality of gas radial bearings 46, and at least one thrust bearing assembly 47 including a gas thrust bearing 48. For the illustrated embodiment, the gas radial bearings 46 support the rotating drivetrain 20 from radial loads approximately perpendicular relative to the centerline 22. Similarly, in the exemplary embodiment, the gas thrust bearing 48 supports the rotating drivetrain 20 axially from loads approximately parallel to the centerline 22.

For the depicted embodiment, the fluid bearing assembly 15 includes the sealing system 54. In the embodiment depicted, the sealing system 54 is hermetically sealed with the closed flowpath 30. For example, the sealing system 54 may surround the fluid bearings to contain the working fluid 31 provided to the fluid bearings and return such working fluid 31 to the closed flowpath 30. As is depicted schematically for the exemplary embodiment, the sealing system 54 includes a containment structure 56 (shown schematically in phantom surrounding the fluid bearings) and the lubrication flowpath 52. As such, for the depicted embodiment, the sealing system 54 is used to provide the fluid bearings (such as the gas radial bearing 46 and the gas thrust bearing 48) with the working fluid 31. For the illustrated embodiment, the lubrication flowpath 52 supplies the fluid bearings with lubrication. Generally, the working fluid 31 may be bled off of the closed flowpath 30 to provide lubrication to the gas radial bearings 46 and/or the gas thrust bearings 48. For example, the gas thrust bearing 48 may be hermetically sealed with the closed flowpath 30. Further, the gas thrust bearing 48 may utilize the working fluid 31 to support the rotating drivetrain 20.

As shown, the working fluid 31 may be bled from the compressor section 23 of the closed flowpath 30 to supply the lubrication flowpath 52 with the working fluid 31. For example, the working fluid 31 may be bled from the compressor 24 using a compressor bleed valve 53. As such, for the embodiment shown, the working fluid 31 is subsequently piped through each fluid bearing both upstream and downstream. For the illustrated embodiment, after supplying lubrication to the fluid bearings, the working fluid 31 is collected by the containment structure 56 and returned to the lubrication flowpath 52 and subsequently to the closed flowpath 30 for the working fluid 31. In such a manner, the containment structure 56 is fluidly connected to the closed flowpath 30. In another embodiment, the working fluid 31 may be returned to the closed flowpath 30 directly from the containments structure 56. Notably, the containment structure 56 includes a forward seal 61 and an aft seal 62 to form a seal with the rotating drivetrain 20. It will be appreciated that any suitable containment structure 56 may be provided. For example, in other embodiments, a plurality of individual containment structures 56 may be provided, one for each fluid bearing. It should be recognized that, in other embodiments, the working fluid 31 may be bled from the expander section 26, such as from the expander 28.

Figure 2:
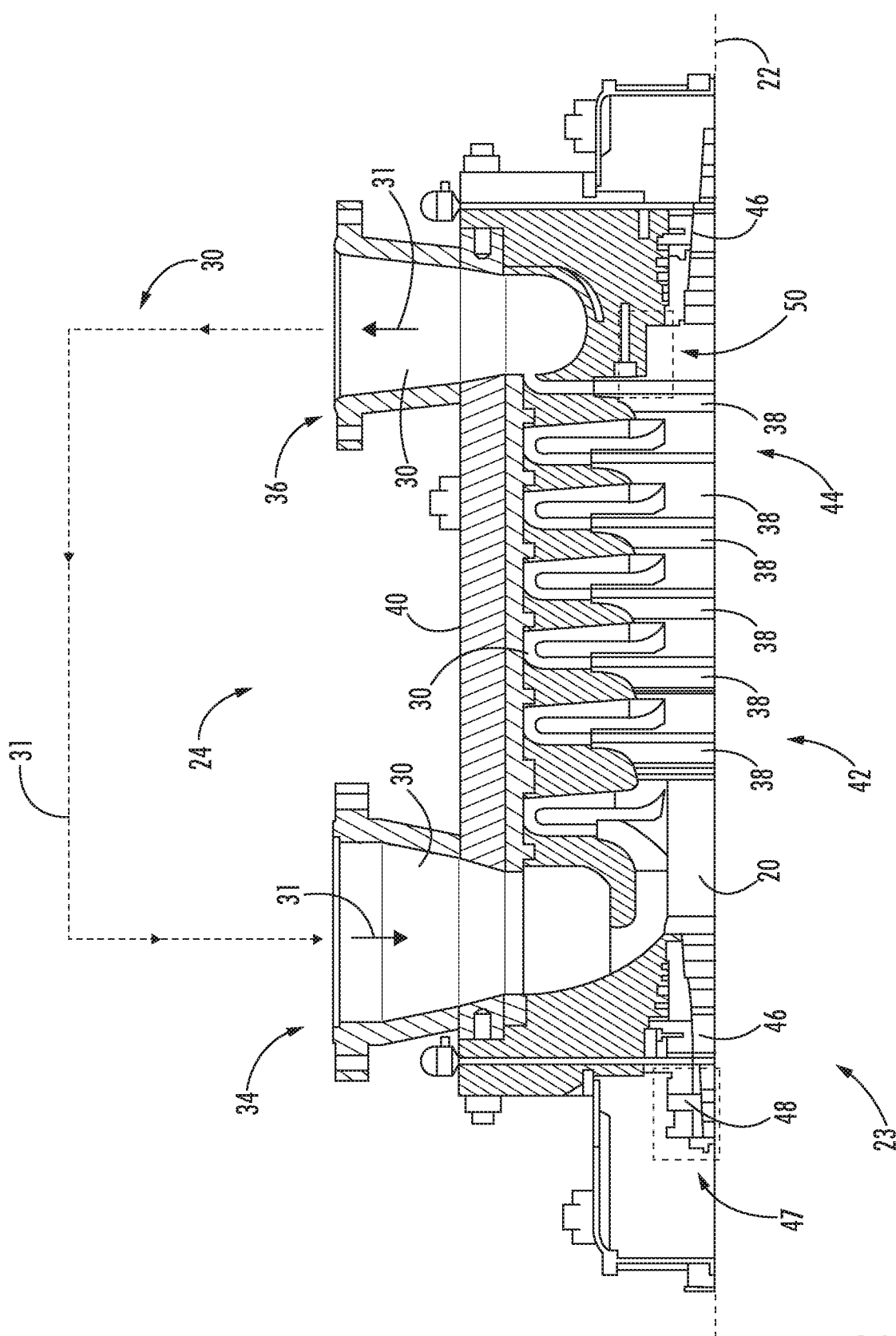
FIG. 2 is a cross-sectional view of a centrifugal compressor according to aspects of the present disclosure.

Referring now to FIG. 2, a cross-sectional view is illustrated of a compressor 24 that may be utilized in the exemplary turbomachine 10 of FIG. 1. For the embodiment depicted, the compressor 24 is a centrifugal compressor, though it should be recognized that other types of compressors 24 may be utilized in the turbomachine 10. For example, the compressor 24 may be an axial compressor. The compressor 24 may generally include an inlet 34 and an outlet 36 for the working fluid 31 to fluidly couple the compressor 24 to other components of the turbomachine 10 (e.g., the expander 28 and the heat exchanger 32). For example, the compressor 24 may at least partially define the closed flowpath 30.

The compressor 24 may include a compressor casing 40 housing the internal structure of the compressor 24. A number of impellers 38 may be coupled to the rotating drivetrain 20 to sequentially compress the working fluid 31. For the embodiment illustrated, the impellers 38 are coupled to the rotating drivetrain 20. For example, the rotating drivetrain 20 may drive the impellers 38 using mechanical energy extracted by the expander 28 (see e.g., FIG. 1). Further, the impellers 38 and the compressor casing 40 may at least partially define the closed flowpath 30. Generally, the impellers 38 may rotate and accelerate the working fluid 31 radially outward in relation to the centerline 22. Such radial acceleration compresses the working fluid 31. In the depicted embodiment, the compressor 24 includes a low pressure region 42 and a high pressure region 44. The low pressure region 42 may include the early stage impellers 38. The high pressure region 44 may include the later stage impellers 38.

For the embodiment illustrated, the compressor 24 includes at least one thrust chamber 50. The thrust chamber(s) 50 may be positioned downstream of one of the impellers 38. For the illustrated embodiment, the thrust chamber(s) 50 is positioned in the high pressure region 44 aft of the last impeller 38. It should be recognized that, in other embodiments, the thrust chamber 50 may be positioned at any of the impellers 38. For example, the thrust chamber 50 may be positioned at one of the impellers 38 in the low pressure region 42. Still in other embodiments, the thrust chamber 50 may be positioned forward of the first impeller 38.

Figure 3:
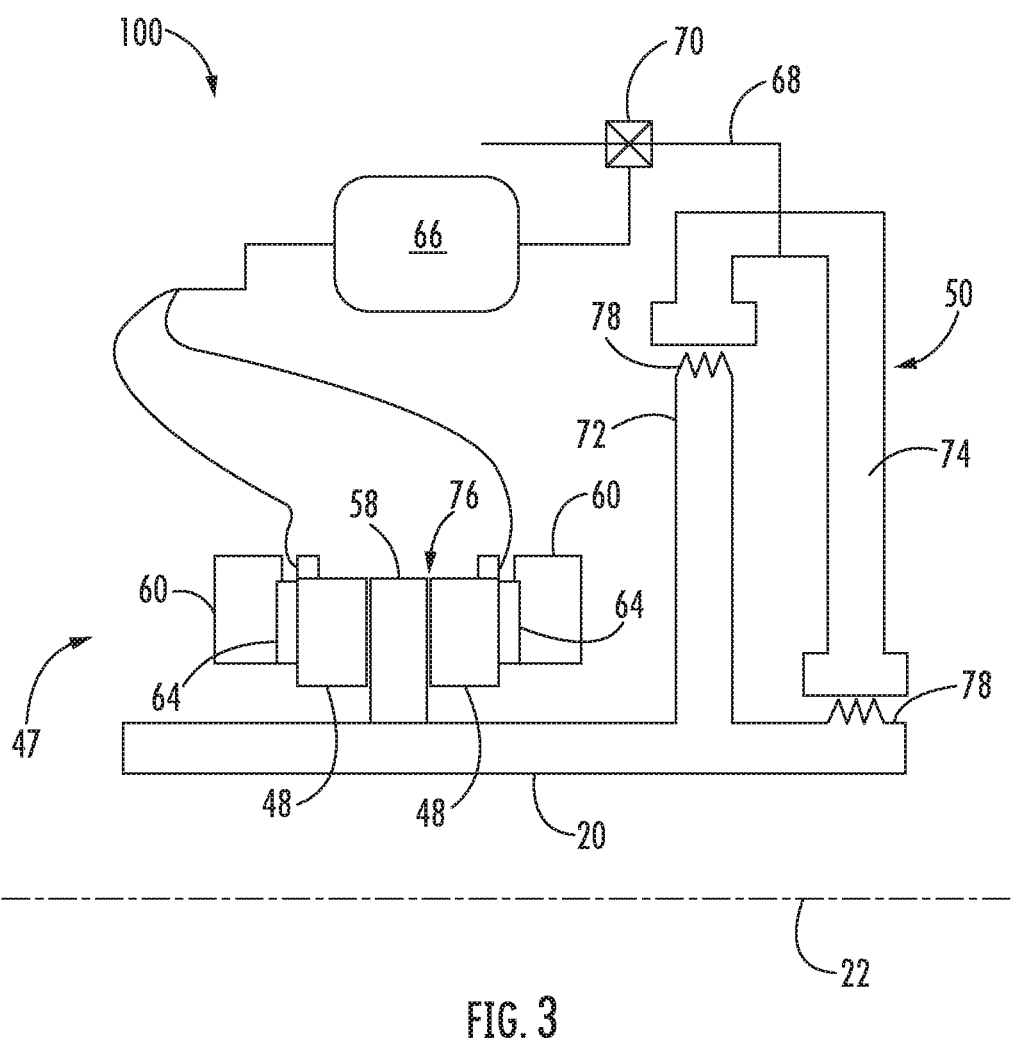
FIG. 3 is a schematic view of an axial load management system according to aspects of the present disclosure that may be utilized in the turbomachine of FIG. 1.

Referring now to FIG. 3, a schematic view of an axial load management system 100 is illustrated including a gas thrust bearing 48 that may be utilized in the exemplary turbomachine 10 of FIG. 1. For the illustrated embodiment, the axial load management system 100 includes the thrust bearing assembly 47. In the exemplary embodiment, the thrust bearing assembly 47 includes a thrust bearing housing 60. In certain embodiments, the thrust bearing housing 60 may be a component of the containment structure 56 (see, e.g., FIG. 1). Still, in other embodiments, the thrust bearing housing 60 may be a separate component. Additionally, the thrust bearing housing 60 may be coupled to the compressor casing 40 (see, e.g., FIG. 2). Further, for the depicted embodiment, the thrust bearing assembly 47 includes a thrust runner 58. The thrust runner 58 may be coupled to the rotating drivetrain 20 such that the thrust runner 58 spins with the rotating drivetrain 20. For example, the thrust runner 58 may extend radially from the rotating drivetrain 20 relative to the centerline 22. The thrust bearing assembly 47 also includes the gas thrust bearing 48 for the exemplary embodiment. The gas thrust bearing 48 may extend between the thrust runner 58 and the thrust bearing housing 60.

The gas thrust bearing 48 may be used to support the rotating drivetrain 20 from axial loads. For example, the working fluid 31 may be bled from the closed flowpath 30 and supplied to the gas thrust bearing 48, as seen in FIG. 1. The working fluid 31 may then be expelled by the gas thrust bearing 48 into a gap 76 defined between the gas thrust bearing 48 and the thrust runner 58. In the illustrated embodiment, the working fluid 31 in the gap 76 creates a film between the thrust runner 58 and the gas thrust bearing 48. The film may lubricate and cushion the thrust runner 58. For example, the film may allow for axial loads to be transferred from the thrust runner 58, through the gas thrust bearing 48, and subsequently applied to the thrust bearing housing 60. After lubricating and cushioning the thrust runner 58, the working fluid 31 may be collected by the containment structure 56 and returned to the closed flowpath 30.

In the exemplary embodiment, the thrust runner 58 is bounded both forward and aft by gas thrust bearings 48. For instance, the gas thrust bearing 48 forward of the thrust runner 58 may support the thrust runner 58, and thus the rotating drivetrain 20, from forward axial loads. Similarly, the gas thrust bearing 48 aft of the thrust runner 58 may support the thrust runner 58 and the rotating drivetrain 20 from aft axial loads. It should be recognized that, in other embodiments, the thrust runner 58 may be bounded by the gas thrust bearing 48 on only one side.

For the illustrated embodiment, the axial load management system 100 includes a valve supply line 68. The valve supply line 68 may be fluidly coupled to the closed flowpath 30 (as described in more detail in regards to FIG. 5). Further, for the exemplary embodiment, a valve 70 is positioned within the valve supply line 68 to selectively allow the working fluid 31 to flow between the closed flowpath 30 and the thrust chamber 50. For example, the valve 70 may be fully opened to allow the working fluid 31 to flow from the closed flowpath 30 to the thrust chamber 50. Similarly, the valve 70 may be partially closed to restrict the flow of the working fluid 31 between the closed flowpath 30 and the thrust chamber 50. Additionally, the valve 70 may be fully closed to prevent the passage of the working fluid 31 through the valve supply line 68.

Still referring to FIG. 3, for the depicted embodiment, the thrust chamber 50 is defined by a rotating surface 72 and a fixed surface 74. The fixed surface 74 may be coupled to or formed with static structure of the turbomachine 10. For example, the fixed surface 74 may be coupled to the containment structure 56 or another casing of the turbomachine 10, such as the compressor casing 40. The rotating surface 72 may be coupled to the rotating drivetrain 20. For instance, the rotating surface 72 may extend radially out from the rotating drivetrain 20 relative to the centerline 22. In other embodiments, the rotating surface 72 may be formed integrally with the rotating drivetrain 20. For example, the rotating drivetrain 20 may include the rotating surface 72. Still, in other embodiments, the rotating surface 72 may be formed with or coupled to any other rotating structure, such as an impeller 38. At least one seal 78 may be positioned between the rotating surface 72 and the fixed surface 74. The seal(s) 78 may be any seal known in the art, such as, but not limited to, a labyrinth seal, a hydrodynamic seal, or a carbon seal.

For the shown embodiment, the thrust chamber 50 is used to modify the axial load on the rotating drivetrain 20. For example, the working fluid 31 may be supplied by the valve supply line 68 to pressurize the thrust chamber 50. Changing the pressure of the thrust chamber 50 may change a force on the rotating surface 72. For example, the pressurized working fluid 31 in the thrust chamber 50 may act on the area of the rotating surface 72. As such, for the embodiment illustrated, the thrust chamber 50 applies a forward force on the rotating surface 72 and thus the rotating drivetrain 20. Supplying more of the working fluid 31 from the valve supply line 68 may increase the pressure of the thrust chamber 50, and thus increase the forward force applied on the rotating drivetrain 20. Alternatively, bleeding air from the thrust chamber 50 may decrease the pressure thereof, and thus decrease the forward force applied on the rotating drivetrain 20. It should be recognized that, in other embodiments, the rotating surface 72 may be aft while the fixed surface 74 may be forward. In such embodiments, the thrust chamber 50 may supply an aft force on the rotating drivetrain 20. By changing the axial load on the rotating drivetrain 20, the thrust chamber 50 may modify the axial load acting on the gas thrust bearing 48.

For the depicted embodiment, the axial load management system 100 includes a sensor 64 attached to at least one of the thrust bearing housing 60 or the gas thrust bearing 48. The sensor 64 may be used to measure the axial force on the gas thrust bearing 48. For example, the sensor 64 may be a force transducer. A force transducer generally converts a mechanical force into an electric output signal. In certain embodiments, the force transducer may be a load cell containing strain gauges. In such embodiments, a deformation of the load cell changes an electric property of the strain gauges that may be correlated to the force applied to the load cell. In certain embodiments, the sensor 64 may be a temperature sensor. A temperature sensor may generally determine the temperature of at least one of the thrust bearing housing 60, the gas thrust bearing 48, or the thrust runner 58. Further, the temperature of the various components of the thrust bearing assembly 47 may be correlated with the force acting on the gas thrust bearing 48. In another embodiment, the sensor 64 may be a pressure sensor. The pressure sensor may generally determine the pressure of a fluid contained within the thrust bearing assembly 47. For example, the pressure sensor may determine the pressure of working fluid 31. Further, the pressure of fluids within the thrust bearing assembly 47 may be correlated with the forces acting on the gas thrust bearing 48.

In the illustrated embodiment, the axial load management system 100 includes two sensors 64 attached the thrust bearing assembly 47. For example, one sensor 64 may be attached at a forward end of the thrust bearing assembly 47 at the thrust bearing housing 60 and/or the gas thrust bearing 48. A second sensor 64 may be attached at an aft end of the thrust bearing assembly 45 at the bearing housing 60 and/or the gas thrust bearing 48. In such embodiments, the two sensors 64 may allow for both the magnitude and direction of the axial load acting on the thrust runner 58 to be determined.

In the embodiment of FIG. 3, the axial load management system 100 includes a controller 66. Thus, in several embodiments, the controller 66 may include one or more processor(s) and associated memory device(s) configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and/or other programmable circuits.

Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory device(s) may generally be configured to store suitable computer-readable instructions that, when implemented by the processor(s), configure the controller 66 to perform various functions.

The controller 66 may be communicatively coupled to the sensor 64 and/or the valve 70. For the illustrated embodiment, the controller 66 communicates a signal to the valve 70 to allow the working fluid 31 to flow between the closed flowpath 30 and the thrust chamber 50. For example, the controller 66 may communicate a signal to open the valve 70, close the valve 70, and/or partially close the valve 70. Allowing the working fluid 31 to flow between the closed flowpath 30 and the thrust chamber 50 may change the pressure of the thrust chamber 50 and thus the axial load on the rotating drivetrain 20. By changing the axial load on the rotating drivetrain 20, the load acting on the gas thrust bearing(s) 48 may be reduced.

Still referring to FIG. 3, the axial load on the gas thrust bearing(s) 48 may be communicated to the controller 66 via the sensor(s) 64. A target axial load may be stored on the controller 66. In certain embodiments, the target axial load may be a neutral axial load. For example, the target axial load may be such that neither a forward nor aft axial force acts on the gas thrust bearing(s) 48. The controller 66 may determine a difference between the target axial load and a measured axial load communicated by the sensor(s) 64. In certain embodiments, the controller 66 may determine a derivative of the axial load on the gas thrust bearing 48 using the measured axial load communicated by the sensor(s) 64. In other embodiments, the controller 66 may determine an integral of the axial load using the measured axial load communicated by the sensor(s) 64. The controller 66 may use at least one of the difference between the target axial load and the measured axial load, the derivative of the axial load, or the integral of the axial load to determine an axial load adjustment. Further, the controller 66 may communicate a signal to the valve 70 to modify the axial force acting on the gas thrust bearing 48.

In certain embodiments, the controller 66 may be a closed loop controller. A closed loop controller may compare a modified output to a target input and make further adjustments to a control variable. For example, the controller 66 may determine a modified axial load acting on the gas thrust bearing(s) 48 based on the signal communicated from the sensor(s) 64. Further, the controller 66 may communicate a signal to further alter the pressure of the thrust chamber 50 and the axial load based on a difference between the modified axial load and the target axial load, a derivative of the modified axial load, and/or an integral of the modified axial load.

Figure 4:
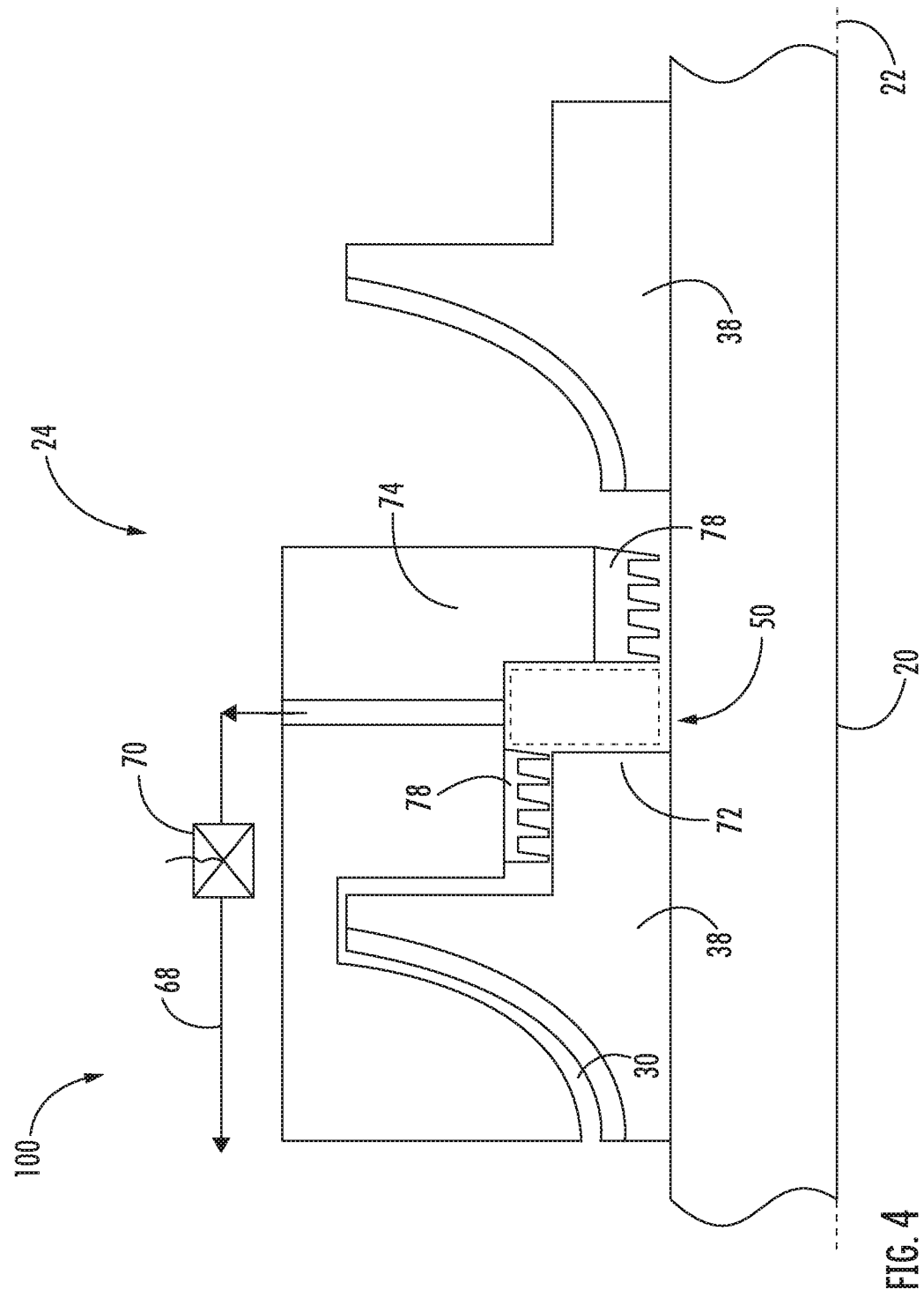
FIG. 4 is a cross-sectional view of a thrust chamber of an exemplary axial load management system according to aspects of the present disclosure.

Referring now to FIG. 4, a cross-sectional view of an exemplary thrust chamber 50 positioned at an interstage of the compressor 24 of the turbomachine 10 is illustrated according to aspects of the present disclosure. In the illustrated embodiment, the thrust chamber 50 is positioned aft of one impeller 38 and forward of another impeller 38. Further, for the depicted embodiment, the forward impeller 38 is the rotating surface 72 partially defining the thrust chamber 50. For example, altering the pressure of the thrust chamber 50 changes the pressure acting on the rotating surface 72, and thus the axial load on the rotating drivetrain 20. For the embodiment illustrated, the valve supply line 68 may fluidly couple the thrust chamber 50 to a segment of the closed flowpath 30 with a lower pressure than the thrust chamber 50, such as the low pressure region 42. In such embodiments, the working fluid 31 may be bled from the thrust chamber 50 via the valve supply line 68 to the closed flowpath 30. For example, the bleeding the working fluid 31 from the thrust chamber 50 may decrease the pressure thereof. By decreasing the pressure of the thrust chamber 50, the forward axial force applied on the rotating surface 72 may be reduced.

Figure 5:
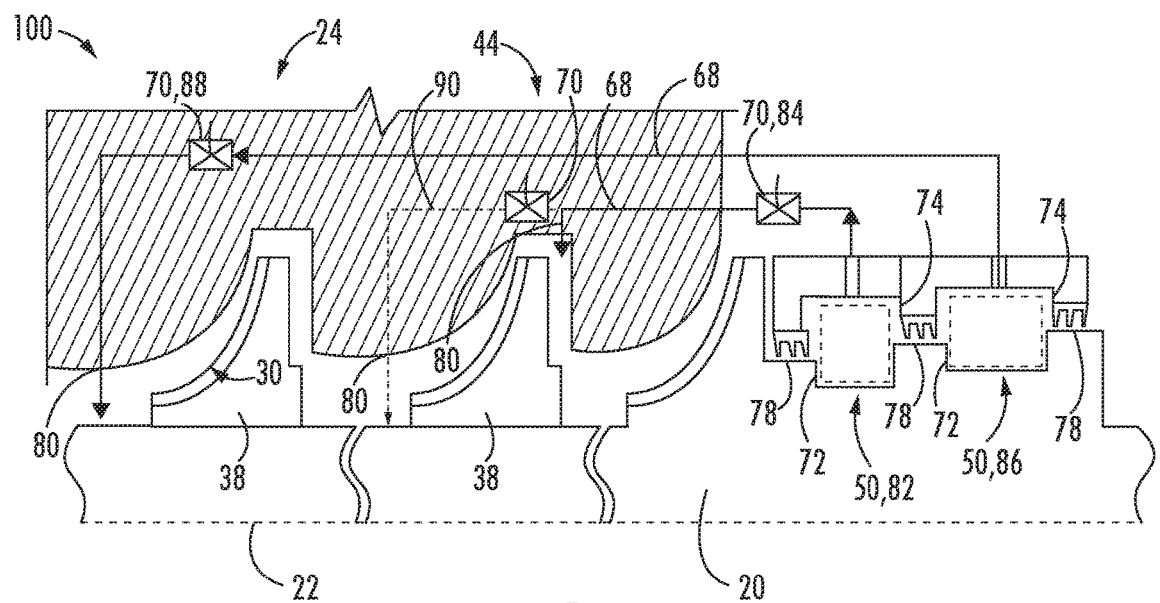
FIG. 5 is a cross-sectional view of another exemplary axial load management system including two thrust chambers in a high pressure region according to aspects of the present disclosure.

Referring now to FIG. 5, a cross-sectional view of an embodiment of the axial load management system 100 including two thrust chambers 50 is illustrated according to aspects of the present disclosure. As briefly described in regards to FIG. 3, the valve supply line 68 may fluidly couple the thrust chamber(s) 50 to the closed flowpath 30. For example, at least one port 80 may allow for the passage of the working fluid 31 to and/or from the thrust chamber(s) 50. Further, the thrust chamber(s) 50 may be hermetically sealed with the closed flowpath 30. For instance, the valve 70 may allow the working fluid 31 to flow between the thrust chamber(s) 50 and the closed flowpath 30 and thus change the pressure of the thrust chamber(s) 50.

In the depicted embodiment, the thrust chamber(s) 50 is positioned in the high pressure region 44 of the compressor 24. For example, the thrust chamber(s) 50 may be positioned aft of the last impeller 38 of the compressor 24. As such, for the embodiment illustrated, the valve 70 is fluidly coupled to the compressor section 23 of the turbomachine 10. For the embodiment illustrated, the pressure of the thrust chamber(s) 50 may be relatively higher than the pressure of the closed flowpath 30. As such, communicating a signal from the controller 66 to open or partially open the valve 70 may allow the working fluid 31 to flow from the thrust chamber(s) 50 to the closed flowpath 30 via the valve supply line 68. In such embodiments, opening the valve 70 may reduce the pressure of the thrust chamber(s) 50.

Still referring to FIG. 5, in certain embodiments, the valve supply line 68 may further include an auxiliary supply line 90. For example, the auxiliary supply line 90 may be used to fluidly couple the valve supply line 68 to two or more ports 80 positioned in the closed flowpath 30. As such, for the embodiment illustrated, the thrust chamber(s) 50 may be fluidly coupled to the closed flowpath 30 at multiple locations via the valve supply line 68 and two or more ports 80. It should also be recognized that the valve supply line 68 may include more than one valve 70. For example, the auxiliary supply line 90 may include another valve 70 positioned within the auxiliary supply line 90 to selectively allow the working fluid 31 to flow through the auxiliary supply line 90.

In the illustrated embodiment, the rotating surface 72 may define the thrust chamber(s) 50 both forward and aft. In such embodiments, the relative areas of the rotating surface 72 forward and aft will determine what direction the force applied by the thrust chamber(s) 50 acts. For example, in the depicted embodiment, the rotating surface 72 has a larger surface area forward of the thrust chamber(s) 50 relative to the surface area aft of the thrust chamber(s) 50. As such, the pressurized working fluid 31 in the thrust chamber(s) may apply a forward force on the rotating drivetrain 20.

In the shown embodiment, the axial load management system 100 includes a first thrust chamber 82 and a first valve 84. For example, the first valve 84 may selectively allow the flow of the working fluid 31 between the first thrust chamber 82 and the closed flowpath 30. Further, for the embodiment shown, the axial load management system 100 includes a second thrust chamber 86 and a second valve 88 to fluidly couple the closed flowpath 30 to the second thrust chamber 86. The second valve 88 may selectively allow the working fluid 31 to flow between the closed flowpath 30 and the second thrust chamber 86. For example, the controller 66 may communicate a signal to open the second valve 88, to close the second valve 88, and/or to partially close the second valve 88. By opening, closing, and/or partially closing the second valve 88, a pressure of the second thrust chamber 86 may be changed. This change in the pressure of the second thrust chamber 86 may modify the axial force on the rotating drivetrain 20 and thus the load on the gas thrust bearing 48. For example, in the illustrated embodiment, opening the second valve 88 may allow the working fluid 31 to flow from the relatively higher pressure in the second thrust chamber 86 to the closed flowpath 30, thereby reducing the pressure of the second thrust chamber 86. The reduction in pressure may reduce the forward axial force applied on the rotating surface 72 and thus modify the load on the gas thrust bearing 48 toward the aft direction.

In certain embodiments, one or more of the seals 78 may act as fluidic resistors between the thrust chambers 50. For example, the pressurized working fluid 31 may be able to leak between thrust chambers 50 through at least one of the seals 78, such as the seal 78 separating the thrust chambers 50. In such embodiments, the thrust chambers 50 may be fluidly coupled such that the pressure in the first thrust chamber 82 is approximately the same as the pressure in the second thrust chamber 86.

Figure 6:
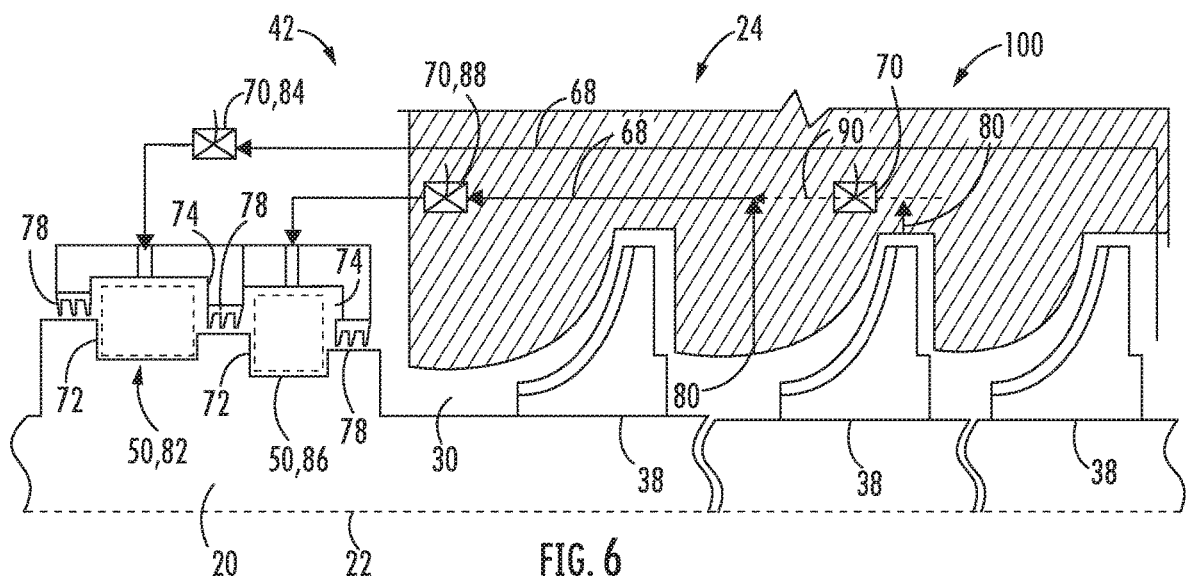
FIG. 6 is a cross-sectional view of a further exemplary axial load management system including two thrust chambers in a low pressure region according to aspects of the present disclosure.

Referring now to FIG. 6, a cross-sectional view of one embodiment of an axial load management system 100 including two thrust chambers 50 in the low pressure region 42 is illustrated according to aspects of the present disclosure. For example, the thrust chamber(s) 50 may be positioned forward of the first impeller 38. In certain embodiments, the pressure of the thrust chamber(s) 50 may be lower than the pressure of the closed flowpath 30. As such, opening or partially opening the valve 70 may allow the working fluid 31 to flow from the closed flowpath 30 to the thrust chamber(s) 50 via the valve supply line 68. In such embodiments, opening the valve 70 may increase the pressure of the thrust chamber(s) 50. As such, increasing the pressure of the thrust chamber(s) 50 may apply a greater forward force on the rotating drivetrain 20 and thus the gas thrust bearing 48.

Figure 7:
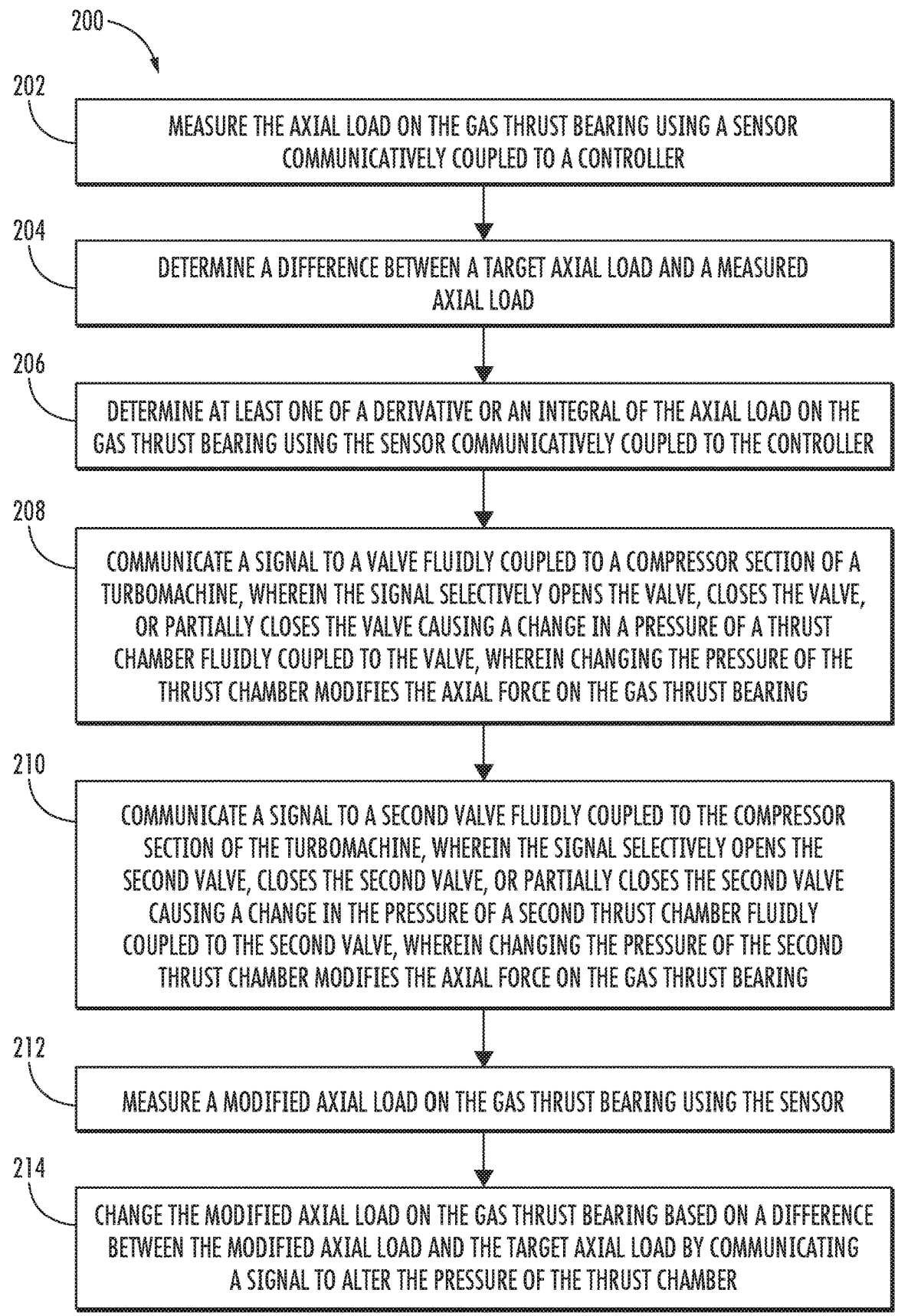
FIG. 7 illustrates one embodiment of a method for managing an axial load on a gas thrust bearing according to aspects of the present disclosure.

Referring now to FIG. 7, one embodiment of a method 200 for managing the axial load on a gas thrust bearing 48 is illustrated according to aspects of the present disclosure. It should be recognized that the method 200 may be utilized with any of the embodiments of the axial load management system 100 described in FIGS. 2-6 or any other capable system. The method 200 may include at step 202, measuring the axial load on the gas thrust bearing 48 using the sensor 64 communicatively coupled to the controller 66. Another step 204 may include determining a difference between the target axial load and the measured axial load. For example, the controller 66 may compare the measured axial load to the target axial load. In certain embodiments, the target axial load may be a neutral axial load. For instance, the neutral axial load may be defined by the gas thrust bearing 48 loaded in neither the forward nor aft directions. The method 200 may include, at step 206, determining at least one of the derivative or the integral of the axial load on the gas thrust bearing 48 using the sensor 64 communicatively coupled to the controller 66. For instance, in certain embodiments, the method 200 includes determining the derivative of the axial load. In other embodiments, the method includes determining the integral of the axial load. Still, in further embodiments, both the integral and the derivative of the axial load may be determined.

At step 208, the method 200 may include communicating a signal to the valve 70 fluidly coupled to the compressor section 23 of the turbomachine 10. The signal may selectively open the valve 70, close the valve 70, or partially close the valve 70 causing a change in the pressure of the thrust chamber 50 fluidly coupled to the valve 70. In addition, changing the pressure of the thrust chamber 50 may modify the axial force on the gas thrust bearing 48.

In certain embodiments, the method 200 may be used with an axial load management system 100 including two thrust chambers 50, such as the embodiments of the axial load management system 100 shown in FIGS. 5 and 6. In such embodiments, the method 200 may include, at step 210, communicating a signal to a second valve 88 fluidly coupled to the compressor section 23 of the turbomachine 10. The signal may selectively open the second valve 88, closes the second valve 88, or partially close the second valve 88 causing a change in the pressure of a second thrust chamber 86 fluidly coupled to the second valve 88. For instance, changing the pressure of the second thrust chamber 86 may modify the axial force on the gas thrust bearing 48.

In additional embodiments, the controller 66 may be a closed loop controller. In such embodiments, the method 200 may include, at step 212, measuring a modified axial load on the gas thrust bearing 48 using the sensor 64. A further step 214 may include changing the modified axial load on the gas thrust bearing 48 based on a difference between the modified axial load and the target axial load. For example, the controller 66 may communicate a signal to alter the pressure of the thrust chamber 50.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An axial load management system for a turbomachine, the axial load management system comprising:
   a rotating drivetrain comprising a compressor section and an expander section, wherein a closed flowpath fluidly couples the compressor section and the expander section such that a working fluid flows from the compressor section to the expander section and back to the compressor section via the closed flowpath;
   a thrust bearing assembly comprising a thrust runner, a thrust bearing housing, and a gas thrust bearing, wherein the gas thrust bearing extends between the thrust runner and the thrust bearing housing, and wherein the gas thrust bearing supports the rotating drivetrain;
   a sensor attached to at least one of the thrust bearing housing or the gas thrust bearing; and
   a valve supply line fluidly coupled to the closed flowpath, wherein a valve is positioned within the valve supply line to selectively allow a working fluid to flow between the closed flowpath and a thrust chamber defined by a rotating surface and a fixed surface to modify an axial load on the rotating drivetrain.

2. The axial load management system of claim 1, further comprising:
   a controller communicatively coupled to the sensor and the valve, wherein the controller communicates a signal to the valve to allow the working fluid to flow between the closed flowpath and the thrust chamber.

3. The axial load management system of claim 1, wherein the gas thrust bearing is hermetically sealed with the closed flowpath, and wherein the gas thrust bearing utilizes the working fluid to support the rotating drivetrain.

4. The axial load management system of claim 1, wherein the thrust chamber is hermetically sealed with the closed flowpath, and wherein the valve allows the working fluid to flow and change a pressure of the thrust chamber.

5. The axial load management system of claim 1, wherein the controller is a closed loop controller.

6. The axial load management system of claim 1, wherein the sensor is a force transducer.

7. The axial load management system of claim 1, wherein the sensor is a temperature sensor.

8. The axial load management system of claim 1, wherein the sensor is a pressure sensor.

9. The axial load management system of claim 1, wherein the valve is a first valve and the thrust chamber is a first thrust chamber, the axial load management system further comprising a second valve fluidly coupled to the closed flowpath, wherein the second valve selectively allows the working fluid to flow between the closed flowpath and a second thrust chamber.

10. The axial load management system of claim 1, wherein the thrust chamber is positioned in a high pressure region of the compressor section.

11. The axial load management system of claim 1, wherein the thrust chamber is positioned in a low pressure region of the compressor section.

12. The axial load management system of claim 1, further comprising:
   a heat exchanger thermally coupled to the closed flowpath for adding heat to the working fluid.

13. A method of managing an axial load on a gas thrust bearing, the method comprising:
   measuring the axial load on the gas thrust bearing using a sensor communicatively coupled to a controller;
   determining a difference between a target axial load and the measured axial load; and
   communicating, with the controller, a signal to a valve fluidly coupled to a compressor section of a turbomachine, wherein the valve is configured to selectively open, close, or partially close based at least in part in response to the received signal causing a change in a pressure of a thrust chamber fluidly coupled to the valve, wherein changing the pressure of the thrust chamber modifies the axial load on the gas thrust bearing.

14. The method of claim 13, further comprising:
   measuring a modified axial load on the gas thrust bearing using the sensor; and
   changing the modified axial load on the gas thrust bearing based on a difference between the modified axial load and the target axial load by communicating a signal to alter the pressure of the thrust chamber.

15. The method of claim 13, wherein the controller is a closed loop controller.

16. The method of claim 13, wherein the target axial load is a neutral axial load.

17. The method of claim 13, further comprising:
   determining a derivative of the axial load on the gas thrust bearing using the sensor communicatively coupled to the controller.

18. The method of claim 13, further comprising:
   determining an integral of the axial load on the gas thrust bearing using the sensor communicatively coupled to the controller.

19. The method of claim 13, further comprising:
   determining a derivative and an integral of the axial load on the gas thrust bearing using the sensor communicatively coupled to the controller.

20. The method of claim 13, wherein the thrust chamber is a first thrust chamber and the valve is a first valve, the method further comprising:
   communicating, with the controller, a signal to a second valve fluidly coupled to the compressor section of the turbomachine, wherein the second valve is configured to selectively open, close, or partially close based at least in part in response to the received signal causing a change in a pressure of a second thrust chamber fluidly coupled to the second valve, wherein changing the pressure of the second thrust chamber modifies the axial load on the gas thrust bearing.

* * * * *